Feb. 10, 1931.  R. C. SHECKELS ET AL  1,792,468
LINE TIGHTENER
Filed March 13, 1930
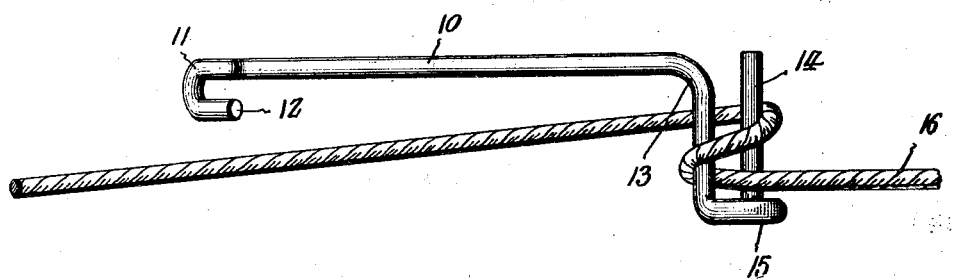
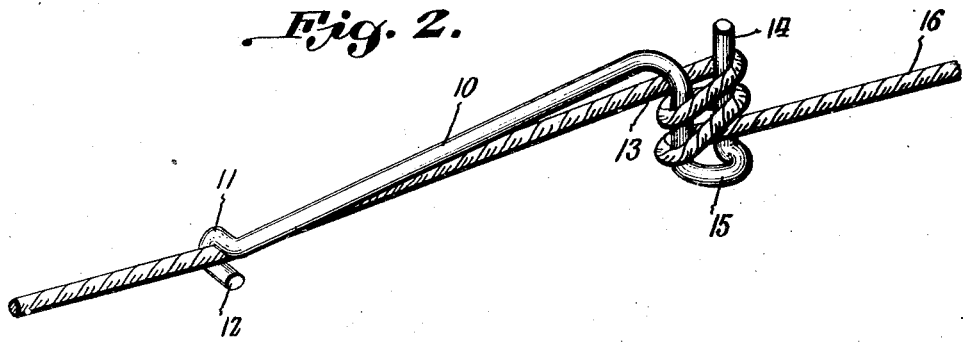
Roscoe C. Sheckels and
Gates R. Carson,
Inventors
By Horace C. Chandler
Attorney Patented Feb. 10, 1931

1,792,468

UNITED STATES PATENT OFFICE

ROSCOE C. SHECKELS AND GATES R. CARSON, OF BRADFORD, PENNSYLVANIA, ASSIGNORS, BY DIRECT AND MESNE ASSIGNMENTS, OF ONE-HALF TO W. D. FOTE, OF OLEAN, NEW YORK, ONE-FOURTH TO ADOLPH ROVITO, OF SYRACUSE, NEW YORK, AND ONE-FOURTH TO ANTHONY SANZO, OF OLEAN, NEW YORK

LINE TIGHTENER

Application filed March 13, 1930. Serial No. 435,519.

This invention relates to new and useful improvements in tightening devices, and particularly to devices for taking up slack in clothes lines, guy ropes, and the like.

One object of the invention is to provide a device by means of which slack, in a guy rope, may be taken up in an efficient manner.

Another object is to provide a slack take-up device wherein the line is held from slipping, while being wound on the device, and wherein the device may be securely held against displacement, to hold the slack.

Other objects and advantages will be apparent from the following description when taken in connection with the accompanying drawing.

In the drawing:

Figure 1 is a perspective view of the device in operative position, with respect to a guy rope.

Figure 2 is a perspective view of the device but in an inverted position with respect to that shown in Figure 1.

Referring particularly to the accompanying drawing, it will be seen that the line tightening device is formed from a single length of suitable stiff wire, and includes the shank portion 10, having one end bent downwardly, at 11, and then laterally and upwardly, to form the U-shaped hook 12, to which more particular reference will be made, later herein. The other end of the shank is extended laterally, in the same direction as the hook 12, as shown at 13, and returned toward the plane of the shank, in parallel relation to the portion 13, the outer ends of these portions 13 and 14 being connected by a bight portion 15. This bight portion 15, however, is bent upwardly out of the plane of the portions 13 and 14, as clearly seen in the drawing.

In the operation of the device, the operator grasps the shank and engages the loop 13—14, with the rope, by passing the rope 16 between the portions 13 and 14, and then rotating the device about the loop as the axis, so that the portions of the rope at the opposite sides thereof will wind about the members 13—14. When the slack has been taken up to the desired degree, the operator swings the shank 10 toward the line or rope, and engages the hook 12 with the rope. This effectively prevents accidental unwinding of the device, and maintains the proper taut condition of the line.

Attention is particularly called to the curve at the junction of the shank 10, and the member 13, such curve being so formed that when the winding operation is being performed, the proper engagement of the rope, on the legs of the loop, will be insured. The insertion of the line, between the legs 13 and 14, and disposing such line within the bight 15, assists in preventing the first convolution of the winding of the rope, on the loop, from slipping from the outer or closed end of such loop.

What is claimed is:

1. A midline slack take-up comprising a shank having a hook on one end for engaging the line, and a line winding loop extending laterally from the other end of the shank, the bight of said loop being extended out of the plane of the loop to prevent slipping of the line wound on said loop.

2. A midline slack take-up formed from a single length of material and including a shank having a hook extending laterally from one end thereof and lying in a plane at an angle to the shank, a line winding loop on the other end of the shank extending laterally therefrom in the same direction as said hook, said loop having the bight or closed end extended at an angle to the plane of the loop.

In testimony whereof, we affix our signatures.

ROSCOE C. SHECKELS.
GATES R. CARSON.